June 14, 1960  J. E. VOLKMANN  2,940,356
PICTURE AND SOUND PRESENTATION SYSTEMS
Filed Feb. 4, 1954  3 Sheets-Sheet 1
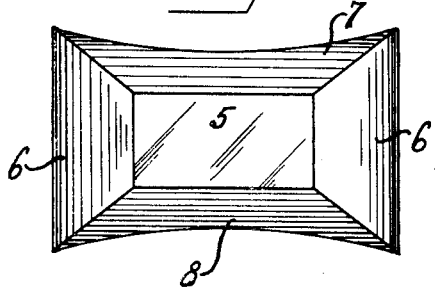
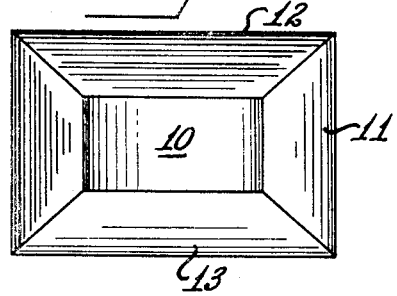
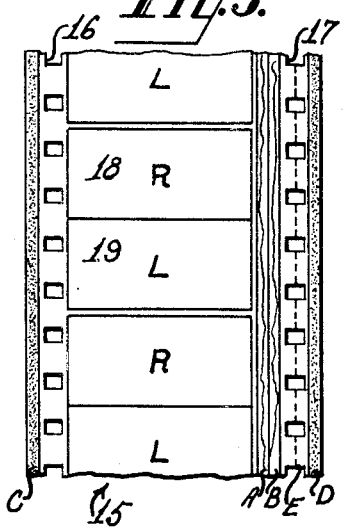
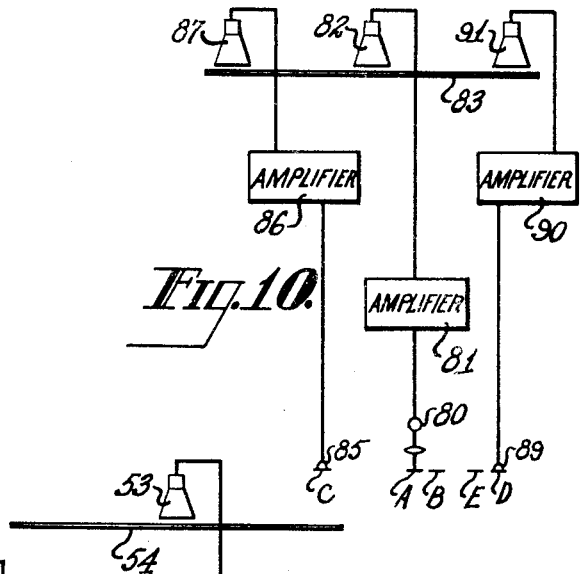
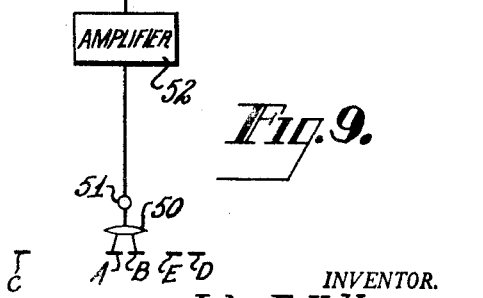
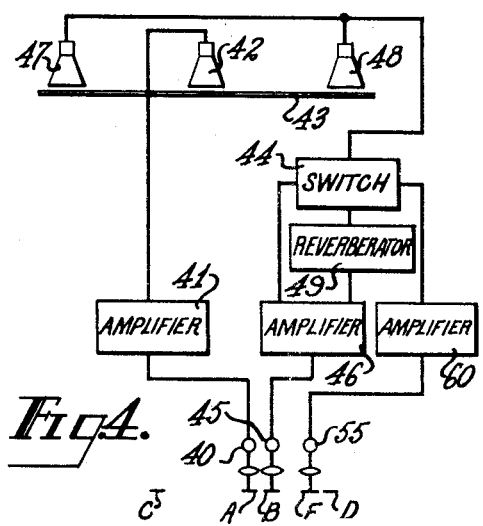
INVENTOR.
John E. Volkmann
BY
ATTORNEY June 14, 1960  J. E. VOLKMANN  2,940,356
PICTURE AND SOUND PRESENTATION SYSTEMS
Filed Feb. 4, 1954  3 Sheets-Sheet 2
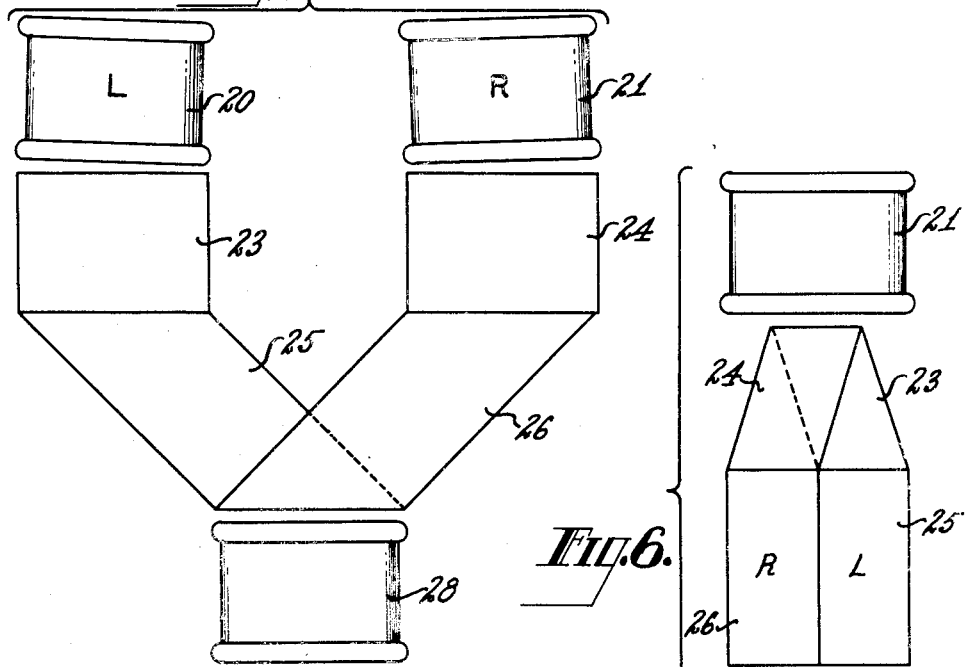
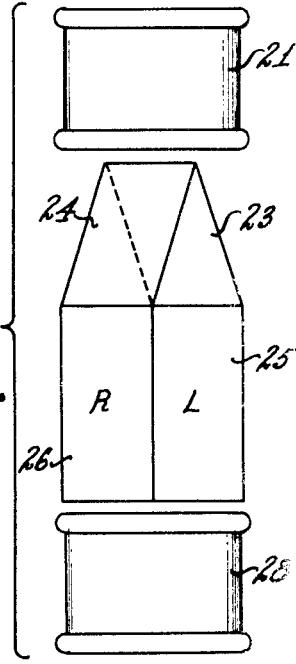
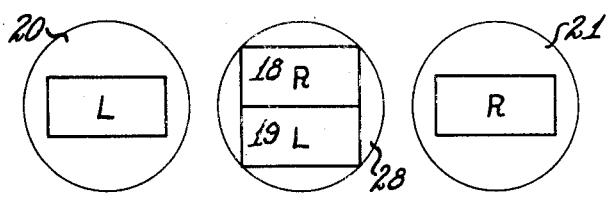
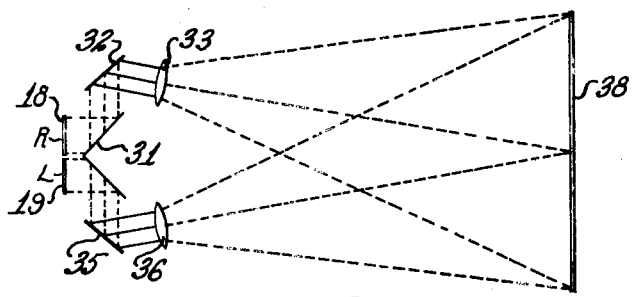
INVENTOR.
John E. Volkmann
BY
ATTORNEY

United States Patent Office 2,940,356
Patented June 14, 1960

2,940,356

PICTURE AND SOUND PRESENTATION SYSTEMS

John E. Volkmann, Haddon Heights, N.J., assignor to Radio Corporation of America, a corporation of Delaware Filed Feb. 4, 1954, Ser. No. 408,139

2 Claims. (Cl. 88—16.2)

This invention relates to picture projection and sound reproducing systems for providing panoramic and stereoscopic picture presentations and directional and stereophonic sound presentations and various combinations thereof.

At the present time, motion pictures are being presented in several different forms. There is the type using curved screens and peripheral vision having either a single projector with an anamorphosing lens or multiple projectors. Another type of picture presentation is third dimensional, using two images which are separated for observation by polarization of the light from the projectors and to the observers' eyes, the latter system also using directional or stereophonic sound systems. The first or peripheral vision system may be said to enhance the illusion of spatial width, while the second or stereoscopic system may be said to enhance the illusion of spatial depth. The combination of these two systems may be said to enhance both the spatial width and depth and may be referred to as panoramic steroscopic, wide angle stereoscopic, or stereo-panoramic systems.

The principal feature of the first type of system is a new aspect ratio. The standard practice is to have the picture based on an aspect ratio of four to three—that is, the width of the picture being related to its height by a ratio of four to three, or of 1.33 to one, generally referred to as 1.33. It has been found that, by increasing the width with respect to the height to ratios between approximately 1.5 to 2.5, a more initimate and realistic picture presentation may be obtained. To some extent, this may be accomplished by a synchronized light "surround," which is simply a light reflecting border for the picture screen which is tilted toward the audience. Light from the picture screen is reflected to the surround and to the audience and varies with the brightness of the picture screen. This has the appearance of increasing the side of the screen and enhancing the presentation of the picture.

It is also possible to have a greater aspect ratio than four to three together with a light surround. Furthermore, the screen may be curved to give it a panoramic effect in combination with the light surround.

It might be further stated that the increased scope of a picture, due to the use of peripheral or wide angle vision and of panoramic viewing, gives a feeling of action to the audience and the feeling of audience participation in the picture. The sense of depth or solidity, which comes with third dimensional or stereoscopy presentations, is a necessary element in the illusion of reality. The illusion of spatial width and depth is enhanced by the use of stereophonic or third dimensional sound, which corresponds with the stereoscopic picture presentation. The audience is also given a sense of spatial illusion from a panoramic production of sounds which completely surrounds the audience.

To permit a film to be used in all theaters, some of which have possibly only one projector, others only two, and others three or more projectors, a picture photographing and projecting system have been provided which will permit one print to provide either panoramic or third dimensional presentations of the picture, or a combination of both. In combination with such systems, multiple sound tracks may be used on a single print, which sound tracks may be of a type which are suitable for two-dimensional pictures in a single projector theater as well as for stereoscopic and stereophonic presentation in the larger theaters. The various combinations will be described after the film and sound systems are described.

The principal object of the invention, therefore, is to facilitate the obtaining of wide screen and third dimensional picture presentations with directional and spatial sound.

Another object of the invention is to provide an improved photographing and projecting system for pictures and a spatial sound system therefor.

A further object of the invention is to provide an improved system for the presentation of pictures in increased aspect ratios and directional sound therefor.

A still further object of the invention is to provide an improved system for picture presentation which may project either two-dimensional panoramic pictures, or three-dimensional panoramic pictures with single channel or multiple channel sound systems.

A still further object of the invention is to provide a system which gives adequate spatial picture and spatial sound effects with the minimum of equipment and changes in production, distribution, and exhibition of the pictures.

A still further object of the invention is to provide a system which permits the maximum spatial reproduction by not only separating or localizing the original sources, but by separating the nearby reflections and multiple reflections from the original sources.

A still further object of the invention is to provide a system which eliminates unsteadiness of the picture images, non-uniform lighting of the images, and prevents any out-of-synchronism condition found in certain multiple film systems for both picture and sound.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view of a flat screen having a light surround.

Fig. 2 is an elevational view of a curved screen having a light surround.

Fig. 3 is a partial view of a combination picture and sound film used in the invention.

Fig. 4 is a single line diagrammatic view of one modification of the sound system.

Fig. 5 is a diagrammatic view of the optical system for a camera for photographing stereoscopic pictures used in the invention.

Fig. 6 is a side view of the system of Fig. 5.

Fig. 7 is an end view of the system of Fig. 5.

Fig. 8 is a diagrammatic view of a projection system used in the invention.

Fig. 9 is a single line view of a single channel sound system.

Fig. 10 is a single line drawing of a multi-channel directional or stereophonic sound system.

Figure 11:
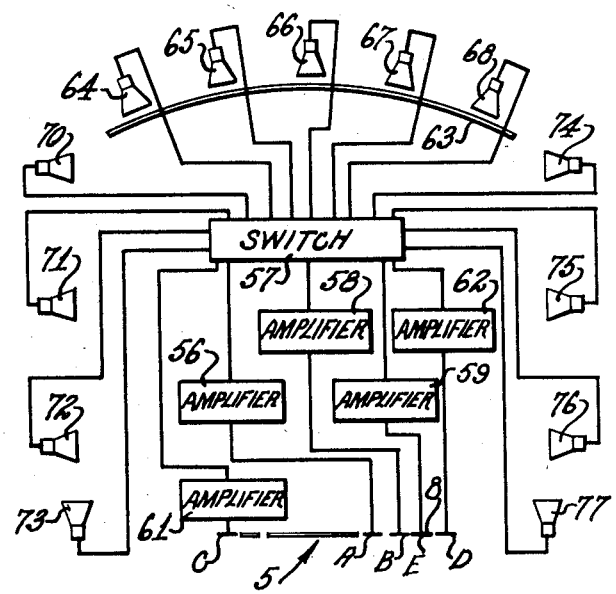
Fig. 11 is a single line drawing of a multiple channel sound system with an inter-switching system.

Referring now to the drawings, Fig. 1 shows a flat screen 5 which may be metalized for the purpose of presenting polarized stereoscopic pictures thereon, and which is provided with a light surround having end portions 6 and upper and lower portions 7 and 8, respectively. The sections 6, 7 and 8 are at an angle with the outer edges and closer to the audience than the screen 5, so that light from the screen 5 may be reflected therefrom to the audience. The outer edges of sections 7 and 8 are curved to provide a better structure and appearance. The screen 5 may have an aspect ratio ranging from approximately 1.5 to 2.5 to provide panoramic or wide scope viewing.

In Fig. 2, a curved screen 10 is shown having a light surround with side sections 11 and upper and lower sections 12 and 13, respectively. The surround sections 11, 12, and 13 may be similar to sections 6, 7, and 8 in Fig. 1, or of the form shown in Fig. 2, while the screen 10 may be curved, metalized, and have an aspect ratio greater than 1.33.

Referring now to Fig. 3, a standard motion picture film section 15 is shown having rows of sprocket holes 16 and 17. The film, however, instead of having one picture in the normal picture area, which includes four sprocket holes, has two pictures in this area. That is, for thirty-five millimeter film, the usual single image for each frame is about 15.25 millimeters by 20.95 millimeters, and this area is now provided with two picture images approximately 9.25 millimeters by 20.95 millimeters, as shown at 18 and 19. This gives a projection image having an aspect ratio somewhat higher than 2.0. For other width films, and in accordance with the number of sound tracks thereon, these sizes would vary proportionally. As shown on the drawing, each of the image areas is marked "R" and "L." These letters indicate that the "R" images are photographed to provide pictures for the right eye, and the "L" images are photographed to provide pictures for the left eye.

The optical system for photographing the pictures is shown in Figs. 5, 6, and 7. This system uses a left-hand photographing lens 20 and a right-hand photographing lens 21. The images received on unit 20 are transmitted through a prism or mirror unit 23, which translates the images downwardly while the prism or mirror unit 24 translates the images from lens 21 upwardly. Then, by converging prisms or mirror units 25 and 26, the images are aligned in a vertical direction and then projected on the film by the unit 28. The position of the images in a horizontal plane is shown in Fig. 7. A system using two synchronized cameras could be used to provide the two images with the proper sized apertures, the two negatives then being printed to a single film.

Referring now to Fig. 8, the projection of the right and left-hand images 18 and 19 is shown. The images are divided by a beam splitting mirror or prism 31, the right-hand image then being reflected by mirror 32 to projection lens 33. The left-hand image is reflected by a mirror 35 to a projection lens 36, the images then being overlapped or superimposed on the screen 38. Thus, from a single film 15, stereoscopic or three-dimensional pictures may be presented when each image is properly light polarized. Furthermore, wide angle or panoramic pictures may be presented from this same single film together with various combinations of panoramic and stereoscopic pictures. The projection may also be provided by two separate synchronized projectors which may be desirable when a theater is provided with such projectors. In this instance, two duplicate prints would be required for use in the two projectors. However, the use of two separate projectors can introduce a certain unsteadiness or lack of synchronism of the images.

The film of Fig. 3 may also be used for a two-dimensional picture in a single projector by projecting alternate right or left views in the normal manner of projection with a projection aperture of the size of one image. The images can be projected on a screen with the proper aspect ratio for wide scope viewing in small theaters, which can be enhanced by the use of a light surround. It is also possible to have two films of the type shown in Fig. 3, which would provide the large aspect ratio with increased light on the screen. Such a system would be desirable for large indoor and drive-in theaters. If the pictures 18 and 19 were exact duplicates obtained by printing or otherwise, they could be projected by the system shown in Fig. 8 with the images in exact registration or by a double rate pull-down mechanism. If the picture images are consecutive, then they can also be projected by a double rate pull-down mechanism. The advantages obtained by these types of projection are an increase in light on the screen with the minimum of flicker.

Referring again to Fig. 3, it will be noted that two sound tracks A and B are provided in the normal sound track area of film. These sound tracks are independent of one another and of the usual photographic type, although they could be magnetic. Also provided on the film are two magnetic tracks C and D, and a control track E of the types shown in Burrill U.S. Patents No. 2,270,260 or 2,270,261 of January 20, 1942, although one of tracks A, B, C or D could be used as a control track. These multiple sound tracks may be used for providing spatial, stereophonic, and directional sound effects, the main feature being that sound track A may contain the dialogue or screen sounds and sound track B may contain the music or off screen sounds and background effects. Also, various combinations of signals, including separation of direct, reflected and reverberated sound effects and control signals, may be used. Furthermore two photographic tracks and two magnetic tracks, the photographic tracks being duplicates of the magnetic tracks, may be recorded on the same film so that the reproduction of either pair will provide the same result.

Another important combination of signals is the use of track A for close-up or direct sound pickup, and track B for reverberant or indirect sound pickup. Tracks C and D may then be used as a two-channel stereophonic system for the close pickup and reproduction of music. Another combination is to employ track A for direct speech pickup, track B for direct music pickup, and control track E for synthetic reverberation and loudspeaker switching. Track A may also be used for direct speech pickup and music and track B for reverberant music and effects.

Certain types of sound systems for using the tracks on the film 15 are shown in Figs. 4, 9, and 10, which figures will now be referred to. The system shown in Fig. 4 has a track A being detected by photocell 40 feeding an amplifier 41 and connected to a speaker 42 which may be adjusted primarily for best reproduction and distribution of voice and is centrally located behind a screen 43. Music and effects track B is detected by a photocell 45 feeding an amplifier 46 the output of which is connected to a switch 44 and reverberator 49 which is connected to switch 44. The output of switch 44 feeds speakers 47 and 48 which may be adjusted primarily for best reproduction and distribution of music and effects and are located at the sides of the screen 43. Control track E is detected by cell 55 feeding amplifier 60 connected to switch 44. Thus, by using only the tracks A and B, a wide dispersion of the sound may be obtained, track A preferably containing the dialogue at high level and the music and sound effects at a low level. The track B will then contain the music and sound effects at high level and the dialogue at low level. Of course, the differentials in level will depend on the character of the sound sources and their environment. For instance, for outdoor dialogue, the sound should emanate only from the center or single source speaker. Furthermore, when a large orchestra only is being presented or sound effects at high volume, both tracks may contain a high level signal for these sounds. If the recording microphones in this case are spread stereophonically, then the solo voices and instruments should preferably be mixed on track "A." By the use of switch 44 and reverberator 49, the music and sound effects may or may not be reverberated to enhance the presentation thereof.

In Fig. 9, a single channel system is shown, wherein only tracks A and B are used, these tracks being simultaneously scanned and projected by a single lens 50 to a photocell 51 feeding an amplifier 52 connected to a single speaker 53 centrally located behind a screen 54. By scanning both tracks, all the dialogue, music, and sound effects are mixed and provided for theaters with only a single sound channel. If the tracks A and B are magnetic tracks, a single magnetic reproducing head will detect both tracks. To obtain definite directional or stereophonic effects, the system shown in Fig. 10 may be used. In this system, the dialogue track A with its low level sound effects is detected by the photocell 80 which feeds an amplifier 81 connected to a speaker 82 centrally located behind a screen 83. Magnetic track C is detected by magnetic head 85 feeding an amplifier 86 and connected to speaker 87 to the left of screen 83. Magnetic track 89 feeds an amplifier 90 connected to a speaker 91 to the right of screen 83. In this type of system, the magnetic tracks C and D primarily will contain stereophonically the music and sound effects and also the dialogue which will have high levels when the source of sound is depicted at the sides of the screen. In this manner, the sources of sound can be localized or made to travel across the screen. The tracks C and D may also contain the music and sound effects in the same manner as track B in Fig. 4. Alternatively, track A may be magnetic in which case a three-channel magnetic stereophonic system could be used.

To obtain panoramic, directional, and stereophonic sound effects, the system shown in Fig. 11 may be used. In this system, dialogue track A is amplified in amplifier 56 and fed to switch 57. The music and sound effects track B is also fed to switch 57 through amplifier 58. The control track E is fed to the switch 57 over amplifier 59. The two magnetic tracks C and D are fed to the switch 57 over respective amplifiers 61 and 62. In this modification, a plurality of speakers behind a curved screen 63 is provided, such as speakers 64, 65, 66, 67 and 68. There is also provided left-hand side speakers 70, 71 and 72 with a rear speaker 73. On the right-hand side of the auditorium, speakers 74, 75, and 76 are used with a rear speaker 77. With such a multiple speaker system, it is particularly adaptable for presenting a "Cinerama" type of picture presentation, utilizing the principle of peripheral vision. The control track may be used to switch the dialogue and music and sound effects among the speakers to follow the source of sound being depicted on the screen 63 and provide special sound effects required by the scene being viewed. The system, therefore, provides peripheral vision with spatial width and stereoscopic pictures with spatial depth or a combination of both, together with directional and stereophonic sound effects.

Other sound systems for using different combinations of tracks are disclosed and claimed in my co-pending U.S. application, Ser. No. 425,103, filed April 23, 1954.

The above system is thus sufficiently flexible to permit projection in theaters having a single operating projector and a single sound channel. It may also be used to obtain peripheral vision presentation, together with wide sound distribution. It may also be used to obtain third dimensional picture presentation from a single film with any desired type of sound presentation. Furthermore, the system may be used to present third dimensional pictures on a curved screen to combine the peripheral vision presentation with stereoscopic pictures.

Also, the above-described systems provide a single film system which is compatible with existing projector systems, offers enhanced illusion of realism by the combination of both spatial width and spatial depth in both picture and sound presentations, is free from the objections of "jitters" and other defects found in the use of dual cameras, dual projectors, such as used for three-dimensional systems, permits flexibility in presentation of two-dimensional, three-dimensional, single, or multiple channel stereoscopic or synthetic room acoustic effects, and single source or multiple source reproduction. The concepts of dual track recording shown in Fig. 4 also have valuable applications for recording sound on films of various widths and for other purposes.

It is to be understood that special effects can be added in any channel, particularly reverberation for music, such reverberation units in different sound systems being shown in my above-mentioned co-pending application. Any of the sound systems in this co-pending application can be used with the different forms of picture presentation shown in this application.

What is claimed is:

1. A sound motion picture presentation system in which a projector projects pictures on a film to a screen, said film having a plurality of picture images and a plurality of sound tracks thereon, adjacent pairs of images longitudinally of the film being of the same scene from different angles, comprising a projector including means adapted to advance film in said projector, a projection screen on which the images of said pictures are projected, an optical system between said film and said screen for simultaneously projecting each of said pairs of adjacent images from said film to said screen in superimposed relationship, a plurality of means for reproducing the signals on said plurality of sound tracks on said film at different positions behind said screen, said last-mentioned means utilizing a pair of said tracks adjacent one another, one of said pair of tracks containing dialogue to be reproduced at a central position behind said screen and the other of said pair of tracks containing music and sound effects to be reproduced at positions at the sides of said screen, said pair of adjacent tracks being also adapted for simultaneous reproduction in a single channel sound reproducing system employing a single sound scanning means for simultaneously scanning both said adjacent tracks and also a single loud-speaker associated with said single scanning means.

2. A motion picture presentation system in accordance with claim 1 in which said pair of tracks adjacent one another are photographic tracks positioned in the normal sound track area of said film, a third track being a control track for controlling sound reproduction at the sides of said screen.

References Cited in the file of this patent

UNITED STATES PATENTS

| | | |
|---|---|---|
| 1,514,543 | Lane | Nov. 4, 1924 |
| 1,591,081 | Curtis | July 6, 1926 |
| 1,781,550 | Kwartin | Nov. 11, 1930 |
| 1,896,836 | Byron | Feb. 7, 1933 |
| 1,921,494 | Wildhaber | Aug. 8, 1933 |
| 1,937,823 | Kelley | Dec. 5, 1933 |
| 1,944,182 | Jones | Jan. 23, 1934 |
| 2,060,204 | Hammond | Nov. 10, 1936 |
| 2,077,702 | Lane | Apr. 20, 1937 |
| 2,101,121 | Wixon | Dec. 7, 1937 |
| 2,148,260 | Comparato | Feb. 21, 1939 |
| 2,282,947 | De Sherbinin | May 12, 1942 |
| 2,298,618 | Garity | Oct. 13, 1942 |
| 2,317,875 | Athey | Apr. 27, 1943 |
| 2,348,410 | Pastor | May 9, 1944 |
| 2,554,532 | Juillet | May 29, 1951 |
| 2,566,700 | Goldsmith | Sept. 4, 1951 |
| 2,729,138 | Bernier | Jan. 3, 1956 |
| 2,778,874 | Mueller | Jan. 22, 1957 |

FOREIGN PATENTS

| | | |
|---|---|---|
| 342,284 | Great Britain | Feb. 26, 1931 |
| 541,808 | Great Britain | Dec. 12, 1941 |
| 728,442 | Germany | Nov. 27, 1942 |
| 1,043,772 | France | June 17, 1953 |